Feb. 18, 1930. L. E. RUSSELL ET AL 1,747,458
LUGGAGE CARRIER FOR AUTOMOBILES
Filed May 11, 1929 2 Sheets-Sheet 1

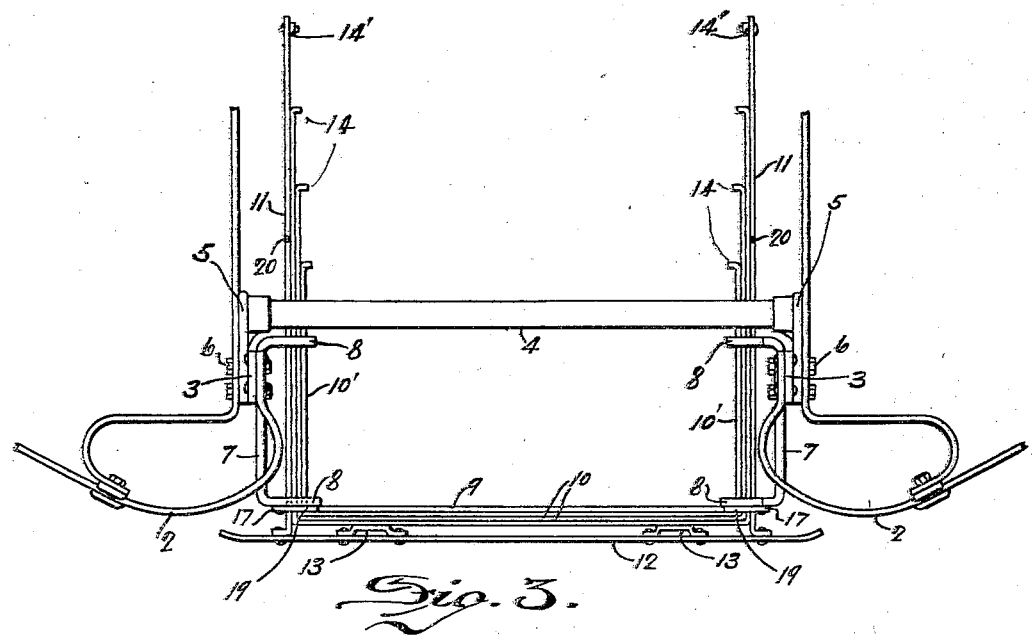
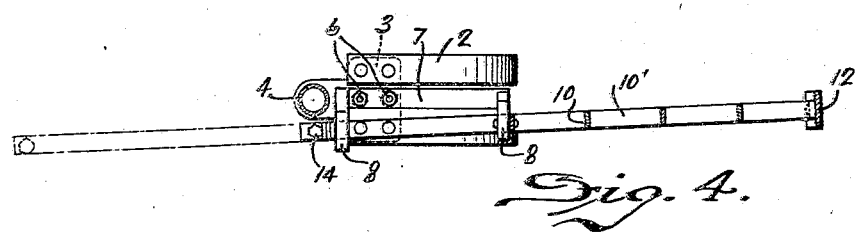
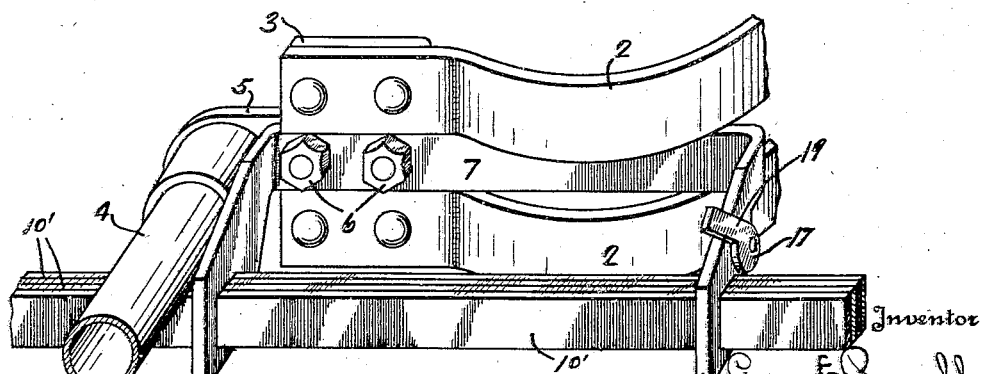

Patented Feb. 18, 1930

1,747,458

UNITED STATES PATENT OFFICE

LINUS E. RUSSELL AND GEORGE E. PETERS, OF SPRINGFIELD, OHIO

LUGGAGE CARRIER FOR AUTOMOBILES

Application filed May 11, 1929. Serial No. 362,368.

This invention relates to package and article carriers and more particularly to a collapsible luggage carrier for motor vehicles.

The present luggage carrier comprises a series of substantially U-shaped bars nested one within another and slidingly mounted in suitable brackets secured to the vehicle chassis. The carrier is particularly designed for application to a well known and popular type of automobile wherein the bolts which ordinarily attach the bumper sections otherwise known as "bumperettes" are also utilized to secure the supporting brackets in which the U-shaped rack bars are slidingly adjustable. The arms of these U-shaped bars are of different lengths and the inner ends of each of the bars are bent laterally into overhanging relation with the ends of the succeeding bars of less length, so that by pulling outward the outermost rack bar to the limit of its movement, the other bars are automatically adjusted in properly spaced relation. Locking means are provided for securing the rack bars in both their outermost and retracted positions.

The object of the invention is to simplify the structure as well as the means and mode of operation of luggage carriers for motor vehicles and the like whereby they will not only be cheapened in construction, but will be more efficient in use, light weight, strong and sturdy, capable of withstanding heavy loads, adapted to be easily and quickly extended and retracted, applicable to existing machines and unlikely to get out of repair.

A further object of the invention is to provide a luggage carrier or rack embodying a succession of spaced article supporting members which are automatically adjusted into predetermined spaced relation upon the extension of the rack.

A further object of the invention is to provide a simple form of rack capable of being economically manufactured and which may be applied to motor vehicles by utilizing existing connection means thereby obviating the necessity for drilling holes or providing special connection. A further object of the invention is to provide an adjustable or collapsible rack or luggage carrier which when retracted will be inconspicuous and will not mar nor distort the appearance of the vehicle and which will further afford an increased protection across the rear of the machine intermediate the usual sectional bumpers or bumperettes.

A further object of the invention is to provide a carrier or rack which when extended will be of pleasing appearance and of convenient size.

With the above primary and other incidental objects in view, as will more fully appear in the specification, the invention consists of the features of construction, the parts and combinations thereof and the mode of operation or their equivalent as hereinafter described and set forth in the claims.

Referring to the accompanying drawings wherein is shown the preferred but obviously not necessarily the only form of embodiment of the invention, Fig. 1 is a rear elevation of a portion of a motor vehicle to which the present rack or luggage carrier has been applied.

Fig. 3 is a similar plan view showing the luggage carrier in its retracted or collapsed condition.

Fig. 4 is a sectional side elevation of the carrier in extended position showing its relation to the bumper structure. Fig. 5 is an enlarged detail perspective view of the supporting bracket for the carrier and adjacent portions of the bumper and carrier.

Like parts are indicated by similar characters of reference throughout the several views.

Figure 1:
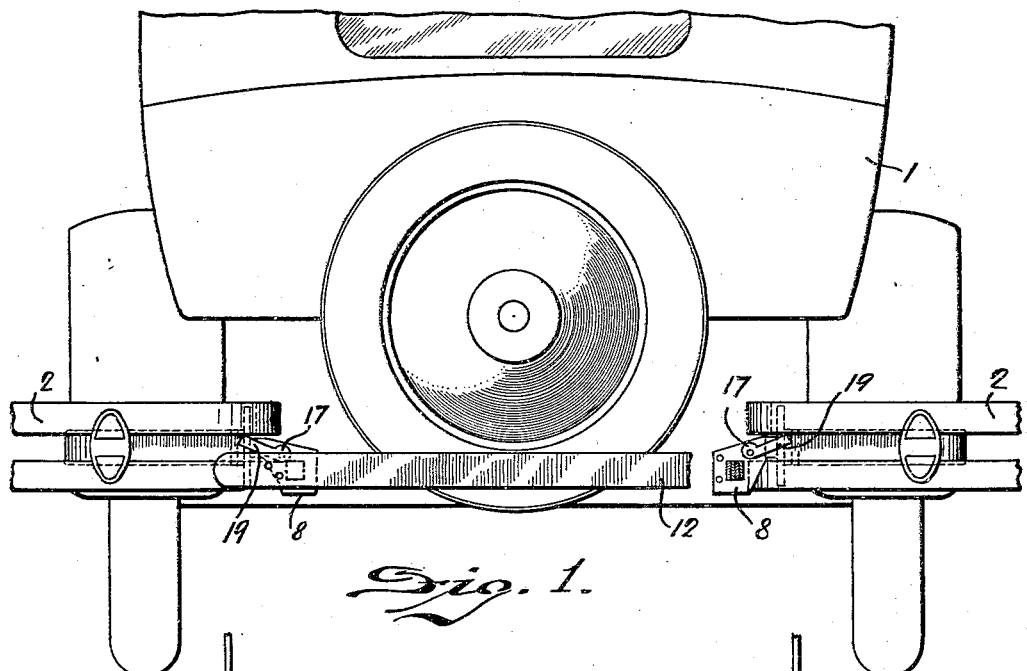

While the present carrier or rack has been especially designed for application to a well known and popular type of automobile, it is to be understood that it is not limited to use on such vehicle, but may be applied to other makes of automobiles.

In the drawings, 1 indicates the rear portion of a motor vehicle of which 2—2 are the conventional separated rear bumper sections or bumperettes. These bumpers 2 comprise vertically spaced bars of arcuate form interconnected by vertically disposed attachment plates 3. A transverse tie rod 4 carries at its ends rearwardly extending bracket arms 5 to which the attachment plates 3 are bolted. The attachment plates 3 project above and below the bracket arm 5 where they are connected with the arcuate bumper bars. This is the usual and typical rear bumper construction, and forms no part per se of the present invention.

In applying the present rack or luggage carrier, the attachment bolts 6, by which the attachment plates 3 are secured to the bracket arms 5, are utilized for securing to the inner sides of such supporting plates 3 U-shaped supporting and guide brackets 7 which carry the adjustable rack bars forming the luggage carrier. The ends of the supporting and guide brackets 7 are inturned and formed into dependent guide heads 8 having therein rectangular openings through which the groups of parallel arms of the rack bars extend. While the supporting brackets 7 are attached to the plate 3 substantially in the horizontal plane of the tie rod 4, the perforated dependent guide heads 8 at each end of the supporting brackets 7 extend downwardly a sufficient distance to permit the arms of the U-shaped rack bars to extend forwardly beneath the transverse tie rod 4. At the same time, these guide heads 8 project inwardly toward each other a sufficient distance to enable the rack bars to clear the adjacent or inner faces of the arcuate bumper bars 2. The heads 8 of the brackets 7 are interconnected by a transverse bar 9.

The rack or carrier comprises a plurality of substantially U-shaped bars 10 preferably, though not necessarily, bent from single lengths of flat stock, the planes of which are vertically disposed. These U-shaped bars 10 are nested one within another, as more clearly shown in Figs. 2 and 3. Exteriorly of the nested U-shaped rack bars 10 is a similarly shaped frame comprising the parallel side bars 11 extending closely adjacent to and parallel with the arms 10' of the U-shaped bars 10 and interconnected at their outer ends by a transverse bar 12 which projects laterally somewhat beyond the side bars 11. This external transverse bar 12 preferably, though not necessarily, carries several strap loops or keepers 13.

The parallel arms 10' of the U-shaped rack bars 10 lie closely adjacent and parallel with each other and together with the parallel side bars 11 extend through the rectangular openings in the forward and rearward guide heads 8 of the supporting brackets 7. At their inner ends, that is, the forward ends with relation to the vehicle 1, the arms 10' are bent laterally as at 14 to afford limiting stops. The inturned ends 14 of the several arms 10' thus overhang the laterally bent ends 14 of adjacent arms, while the bent ends of the innermost arms 10' overhang the guide heads 8, thereby limiting their withdrawal. Instead of being bent laterally at their extremities, the side bars 11 are provided with stop bolts 14' which perform the same function as the laterally bent ends of the arms 10'. These stop bolts 14' permit the convenient assembly of the rack bars within the perforated guide plate and permit their removal, which would be difficult, if not impossible, if the ends of the side bars 11 were laterally bent as are the arms 10'.

Figure 2:
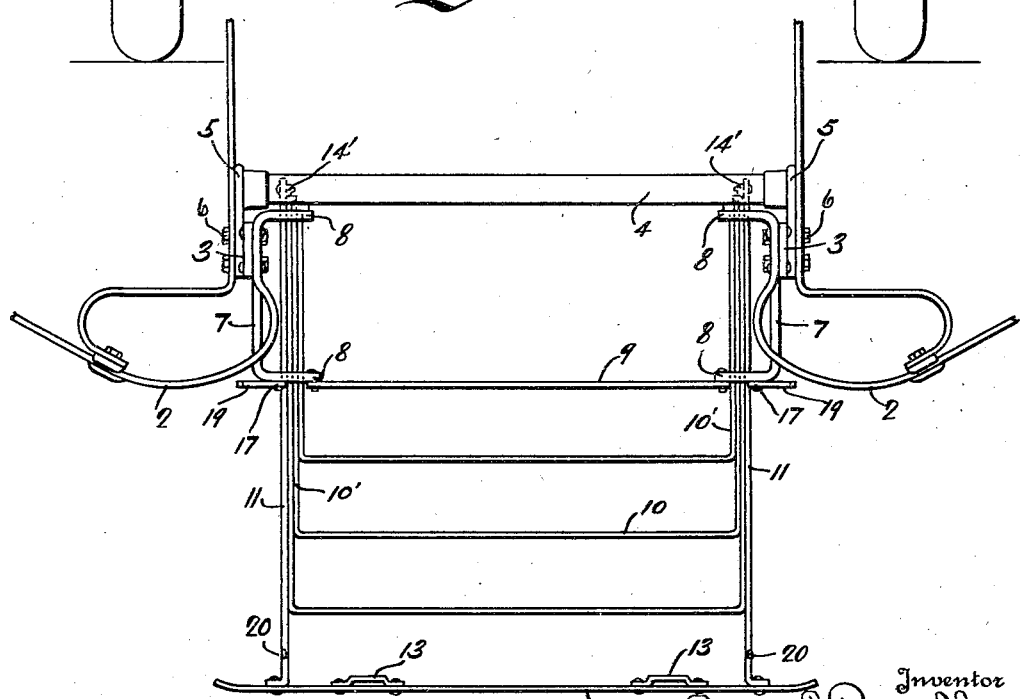
Fig. 2 is a top plan view of the rear bumper construction of a motor vehicle to which the present adjustable rack or luggage carrier is shown applied in its extended position.

The rack is collapsed by thrusting the several frames inwardly, that is, forwardly relative to the vehicle. During this movement the outer frame comprising the side bars 11 and transverse bar 12, moves a short distance independent of the nested U-shaped bars 10 whereupon it engages with the first of such bars, carrying such bar with it through the remainder of its range of movement. Each of the U-shaped bars 10 is engaged in turn for movement with the preceding bar until such bars are finally collected into a compact group as shown in Fig. 3. Upon extension of the rack for use, the bar 12 of the outermost frame is grasped and drawn outwardly. The stop bolts 14' in the ends of the side bars 11 engage the bent ends of the arms 10' of the succeeding U-shaped rack bar, which is then carried with the outer frame. Each U-shaped rack bar is engaged in turn by the inturned ends 14 of the preceding bar until finally the group of bars are disposed in extended spaced relation as shown in Fig. 2.

Various forms of locking means may be employed for clamping or locking the parts in their adjusted position. One form of such locking means comprises a pair of swinging arms having eccentric heads 17 pivoted to the guide heads 8 and having operating handles or levers 19 by which the eccentric may be oscillated. The side bars 11 are preferably, though not necessarily, formed with spaced notches 20 within which the eccentrics 17 engage when in their operative position. These notches 20 are so located in the side bars 11 that one pair of notches register with and receive the eccentric locking members 17 when the rack is in its innermost position while the other pair of such notches receive the eccentrics when the rack is extended.

There is thus provided an extensible and collapsible rack or luggage carrier having but few parts and which is easily extended and retracted. When it is in its retracted position, the rack is concealed from view beneath the vehicle with the transverse bar 12 affording the additional function of a bumper bar for protection of the rear of the vehicle.

The present device not only affords a convenient luggage carrier, but it also serves as a rear bumper or guard for protection of the rear of the vehicle. While it is shown and described as mounted upon the sectional bumperettes, this is merely incidental to present day automobile equipment. The present luggage carrier may be utilized as a bumper in lieu of other bumper devices, such as the bars 2, and the brackets 7 may be secured to other suitable parts of the vehicle.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in langauge more or less specific as to structural features, it is to be understood that the invention is not limited to the specific details shown, but that the means and construction herein disclosed comprise the preferred form of several modes of putting the invention into effect and the invention is, therefore, claimed in any of its forms or modifications within the legitimate and valid scope of the appended claims.

Having thus described our invention, we claim:

1. In an adjustable luggage carrier for motor vehicle, a series of substantially U-shaped bars nested one within the other for limited reciprocatory motion, the arms of the succeeding bars of the series being progressively of different length, supporting members in which the arms of said bars are mounted for reciprocatory motion, and means by which the bars are successively intercoupled for movement into extended spaced relation with the transverse portions of said bars.

2. In a collapsible luggage carrier, a group of nested U-shaped frames, supporting and guiding means in which the arms of the frames are mounted for to and fro reciprocatory motion, and means for progressively interconnecting the frames one with another at intervals for unison motion.

3. In a luggage carrier for motor vehicles, the combination with a pair of independent spaced bumperettes mounted upon a motor vehicle, of suporting and guiding means mounted upon the bumperettes, and a rack structure slidingly mounted intermediate said bumperettes upon said supporting and guiding means.

4. In a luggage carrier for motor vehicles, the combination with bumper supporting brackets, a bumper structure, rack supporting and guiding members, bolts common to the bumper structure and rack supporting and guiding means for connecting such parts to said bumper supporting brackets, and a carrier rack slidingly mounted in said supporting and guiding means.

5. The combination with a vehicle bumper structure, of a carrier rack structure and carrying brackets common to the bumper structure and the carrier rack.

6. The combination with a vehicle bumper and carrier brackets for originally supporting the bumper structure only, of a carrier rack and supporting means for said rack engageable with the bumper carrier brackets.

7. The combination with a vehicle bumper and carrier brackets therefor of substantially U-shaped carrier supporting members attached to the bumper brackets, the ends of said carrier supporting members being extended inwardly toward each other and downwardly and a carrier frame slidingly mounted on the inwardly and downwardly extending portions of said supports.

8. The combination with a motor vehicle, of an extensible and contractible rear bumper construction therefor, guide means carried by the vehicle in which the bumper structure is slidingly mounted for fore and aft motion, means for locking the bumper construction in different positions of adjustment, and a series of supporting bars distributively adjustable into spaced relation with each other and with the bumper structure and forming in conjunction therewith a luggage carrier.

9. The combination with a motor vehicle, of supporting and guide brackets carried thereby, a rear bumper for said vehicle slidingly mounted in said brackets for fore and aft adjustment, including a series of substantially U-shaped frames nested one within another, and means by which the frames are progressively interengaged with each other for unison adjustment into extended position for use as a luggage carrier, and locking means for securing the bumper in different positions of adjustment.

10. A luggage carrier for a motor vehicle comprising a series of substantially U-shaped frames nested one within another, supporting and guide brackets in which the parallel arms of the frames are mounted for reciprocatory motion, the said arms of different frames being of different lengths, projections on the longer arms overhanging the ends of the shorter arms whereby the frames will be progressively engaged one with another for unison adjustment into extended relation, and locking means for securing said frames in different positions of adjustment.

11. In a construction of the character described, a pair of substantially U-shaped supporting and guiding brackets, the parallel heads of which are perforated, a series of substantially U-shaped frames nested one within another, the parallel arms of which slidingly extend through the perforations of the bracket heads, said frames being relatively adjustable to present their transverse portions in parallel spaced relation for use as a luggage carrier.

12. In a construction of the character described, the combination with a motor vehicle, of a rear bumper bar, a pair of parallel spaced arms extending in a forwardly and rearwardly direction upon which the bumper bar is carried, supporting brackets mounted upon the vehicle in which the said arms are slidingly adjustable, transverse supporting bars adjustable into parallel spaced relation intermediate the bumper bar and the vehicle when the arms are extended whereby said structure is usable as a luggage carrier, and locking means for securing the bumper bar and arms in their adjusted positions.

13. In a construction of the character described, a substantially U-shaped frame, supporting brackets in which the frame is mounted for reciprocatory movement in the rear of a motor vehicle, a series of transverse supporting bars disposed intermediate the transverse portion of said U-shaped frame and the vehicle, said bars being adjustable to substantially parallel spaced relation when the frame is extended for use as a luggage carrier, and locking means for securing the frame in its adjusted position.

14. The combination with a motor vehicle, of a pair of fixedly mounted bumperettes, a transverse bumper bar bridging the space between the bumperettes with its ends overhanging said bumperettes beyond which the bumperettes extend in opposite directions, supporting means therefor upon which the bar is mounted for adjustment in a fore and aft direction toward and from the fixed bumperettes, luggage supporting means interposed between the bumper bar and the vehicle when the bumper bar is extended, and locking means for securing the bumper bar in different positions of adjustment.

15. The combination with a motor vehicle, of a luggage carrier including a series of transverse bars mounted in the rear of the vehicle for relative adjustment in a fore and aft direction, supporting means therefor, means for automatically adjusting a plurality of said bars to parallel spaced relation by the manual adjustment of one of the bars, and locking means for securing the bars in their adjusted positions.

16. The combination with the bumper brackets of an automobile, of a pair of brackets rigidly secured thereto by the same bolts that hold the bumpers to said first mentioned brackets, a rack slidingly mounted upon said last mentioned brackets and means to rigidly hold said rack in extended or retracted position.

17. The combination with the bumper brackets of an automobile, of a pair of brackets having inwardly extending perforated ears secured to the bumper brackets by the same bolts that hold the bumpers thereto, a rack slidingly mounted in the perforated ears of the last mentioned brackets and means to rigidly hold said rack in extended or retracted position.

18. The combination with the bumper brackets of an automobile, of a pair of guide members secured thereto by the same bolts that hold the bumpers to said brackets, a reciprocatory rack structure mounted in said guide members for to and fro motion in a fore and aft direction and means to rigidly hold said rack in extended or retracted position.

19. The combination with the bumper brackets of an automobile, of a pair of independent spaced bumper members carried thereby, an intermediate transverse bumper bar normally overhanging said bumper members at its opposite ends, a sliding mounting for said transverse bumper bar by which said bar may be shifted rearwardly into spaced relation with the independent bumper members for use as a carrier rack and means for securing the bumper bar in extended position.

In testimony whereof, we have hereunto set our hands this 6 day of May, A. D. 1929.

LINUS E. RUSSELL.
GEORGE E. PETERS.